US012103110B2

(12) United States Patent
Sakamoto et al.

(10) Patent No.: US 12,103,110 B2
(45) Date of Patent: Oct. 1, 2024

(54) LASER PROCESSING APPARATUS AND LASER PROCESSING METHOD

(71) Applicant: VIA MECHANICS, LTD., Atsugi (JP)

(72) Inventors: Atsushi Sakamoto, Atsugi (JP); Masaru Futaana, Atsugi (JP); Takeshi Satoh, Atsugi (JP); Yusuke Takegawa, Kanagawa (JP)

(73) Assignee: VIA MECHANICS, LTD., Atsugi (JP)

( * ) Notice: Subject to any disclaimer, the term of this patent is extended or adjusted under 35 U.S.C. 154(b) by 469 days.

(21) Appl. No.: 16/774,261

(22) Filed: Jan. 28, 2020

(65) Prior Publication Data

US 2020/0298344 A1  Sep. 24, 2020

(30) Foreign Application Priority Data

Mar. 22, 2019  (JP) .................................. 2019-055711
Nov. 26, 2019  (JP) .................................. 2019-212890

(51) Int. Cl.
*B23K 26/388* (2014.01)
*B23K 26/06* (2014.01)
(Continued)

(52) U.S. Cl.
CPC ........ *B23K 26/388* (2013.01); *B23K 26/0626* (2013.01); *B23K 26/064* (2015.10);
(Continued)

(58) Field of Classification Search
CPC ........................ B23K 26/388; B23K 26/064; B23K 26/0821; B23K 26/0626; B23K 26/073; B23K 26/082
(Continued)

(56) References Cited

U.S. PATENT DOCUMENTS

2002/0040893 A1*  4/2002  Arai ..................... B23K 26/389
                                                              219/121.76
2007/0075063 A1   4/2007  Wilbanks et al.
(Continued)

FOREIGN PATENT DOCUMENTS

CN  102481664 A  5/2012
CN  103302411 A  9/2013
(Continued)

OTHER PUBLICATIONS

TW First Office Action for Application No. 109102304, mailed Jan. 7, 2023.
(Continued)

*Primary Examiner* — Nathaniel E Wiehe
*Assistant Examiner* — Alba T Rosario-Aponte
(74) *Attorney, Agent, or Firm* — NIXON PEABODY LLP

(57) ABSTRACT

A laser processing apparatus includes: a laser oscillator configured to oscillate a laser pulse; a first laser deflection unit configured to deflect the laser pulse emitted from the laser oscillator in a two-dimensional direction; a second laser deflection unit having a slower operation speed and configured to deflect the laser pulse emitted from the first laser deflection unit in a two-dimensional direction on a same plane; a laser oscillation control unit configured to control the laser oscillator; and first and second laser deflection control units respectively configured to control operations of the first and second laser deflection units. The first laser deflection control unit controls the first laser deflection unit to successively irradiate the laser pulse to multiple sites along a predetermined track in each of the processing positions in turn, and to change energy of the laser pulse emitted therefrom in a middle of repeated irradiation.

4 Claims, 4 Drawing Sheets

(51) Int. Cl.

| | | |
|---|---|---|
| *B23K 26/064* | (2014.01) | |
| *B23K 26/073* | (2006.01) | |
| *B23K 26/082* | (2014.01) | |
| *B23K 26/40* | (2014.01) | |
| *B23K 103/18* | (2006.01) | |
| *G02B 19/00* | (2006.01) | |
| *G02B 26/08* | (2006.01) | |
| *G02B 26/10* | (2006.01) | |
| *G02F 1/33* | (2006.01) | |

(52) U.S. Cl.
CPC ........ *B23K 26/073* (2013.01); *B23K 26/0821* (2015.10); *B23K 26/40* (2013.01); *G02B 26/0816* (2013.01); *G02B 26/105* (2013.01); *G02F 1/33* (2013.01); *B23K 2103/18* (2018.08); *G02B 19/0009* (2013.01); *G02B 19/0047* (2013.01)

(58) Field of Classification Search
USPC .......................... 219/121.62, 121.61, 121.6
See application file for complete search history.

(56) References Cited

U.S. PATENT DOCUMENTS

| | | | |
|---|---|---|---|
| 2008/0031291 A1 | 2/2008 | Kobayashi et al. | |
| 2016/0250714 A1* | 9/2016 | Zhang ................ | B23K 26/0608 219/121.61 |
| 2019/0001442 A1* | 1/2019 | Unrath ................ | B23K 26/082 |
| 2021/0276125 A1* | 9/2021 | Lu ........................ | B23K 26/127 |
| 2021/0331273 A1* | 10/2021 | Finn .................... | B23K 26/0624 |
| 2022/0048135 A1* | 2/2022 | Brookhyser ....... | B23K 26/0652 |

FOREIGN PATENT DOCUMENTS

| | | |
|---|---|---|
| CN | 103358026 A | 10/2013 |
| CN | 107405724 A | 11/2017 |
| CN | 108890153 A | 11/2018 |
| JP | 2003-048088 A | 2/2003 |
| JP | 2003-136270 A | 5/2003 |
| JP | 2005342749 A | 12/2005 |
| JP | 2006026699 A | 2/2006 |
| JP | 2008-036667 A | 2/2008 |
| JP | 2011101904 A | 5/2011 |
| TW | 201644128 A | 12/2016 |
| TW | 201830810 A | 8/2018 |
| TW | 201832858 A | 9/2018 |
| WO | 2016-185614 A1 | 11/2016 |

OTHER PUBLICATIONS

TW Search Report for Application No. 109102304, mailed Jan. 7, 2023, w/ First Office Action.
CN First Office Action for Application No. 202010082444.X, mailed Jan. 19, 2023.
CN Search Report for Application No. 2020 0082444.X, mailed Jan. 19, 2023, w/ First Office Action.
JP Office Action for Application No. 2019-212890, mailed Jun. 5, 2023, (11 pp., includes English translation).

* cited by examiner

FIG. 2
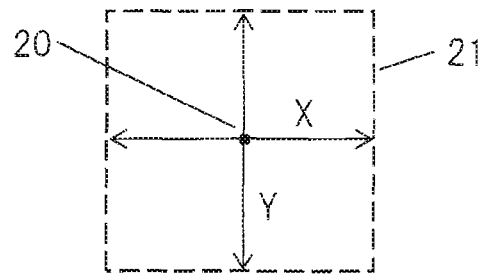
FIG. 3
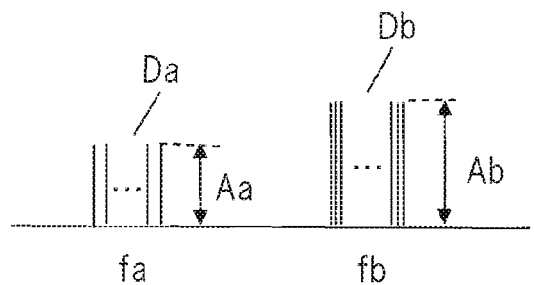
FIG. 4
| Position in X direction | Frequency | Amplitude for copper layer | Amplitude for resin layer |
|---|---|---|---|
| X1 | fx1 | C-Ax1 | P-Ax1 |
| X2 | fx2 | C-Ax2 | P-Ax2 |
| X3 | fx3 | C-Ax3 | P-Ax3 |
| ⋮ | | | |
13X FIG. 5
| Position in Y direction | Frequency | Amplitude for copper layer | Amplitude for resin layer |
|---|---|---|---|
| Y1 | fy1 | C-Ay1 | P-Ay1 |
| Y2 | fy2 | C-Ay2 | P-Ay2 |
| Y3 | fy3 | C-Ay3 | P-Ay3 |
| . | | | |
| . | | | |
| . | | | |
13Y
FIG. 6
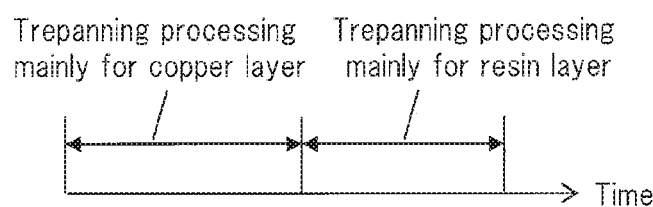
FIG. 7
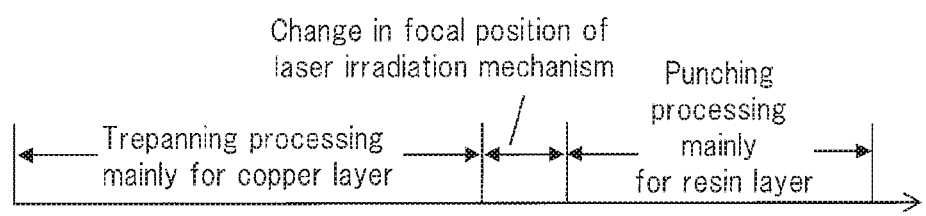

LASER PROCESSING APPARATUS AND LASER PROCESSING METHOD

CROSS-REFERENCE TO RELATED APPLICATION

The present application claims priority from Japanese Patent Applications No. 2019-55711 filed on Mar. 22, 2019, and No. 2019-212890 filed on Nov. 26, 2019, the contents of which are hereby incorporated by reference in their entirety.

TECHNICAL FIELD OF THE INVENTION

The present invention relates to a laser processing apparatus and a laser processing method suitable for a case where punching (or hole making) is carried out at multiple positions of a substrate including layers whose energy required for processing is different from each other by using laser. For example, the substrate is a substrate in which a metal layer such as a copper layer is provided on a surface thereof and a resin layer is laminated beneath the copper layer.

BACKGROUND OF THE INVENTION

FIG. 8 illustrates an example of a substrate including layers whose energy required for processing is different from each other, and is a sectional view of a substrate in which a copper layer 81 is provided on a substrate surface thereof and a resin layer 82 is laminated beneath the copper layer 81. A reference numeral 84 indicates a copper layer laminated beneath the resin layer 82. Energy of the copper layer required for the processing is greater than that of the resin layer.

As a method of processing the copper layer 81 and the resin layer 82 at multiple positions of this substrate 1 by using laser to make blind holes 83, there are conventionally methods as follows. FIG. 7 is a timing chart for explaining processing progress thereof.

Namely, a UV laser whose absorption ratio with respect to copper is well is used as the laser, and processing for the copper layer 81 is mainly carried out at one hole position as a first stage. In this processing, energy density of a laser pulse is heightened by making a diameter of the laser beam smaller. For example, a mechanical laser deflection mechanism (not illustrated in the drawings) such as a galvano scanner successively irradiates laser to multiple sites along a predetermined volute (or spiral) track. Hereinafter, processing of successively irradiation to the multiple sites along the predetermined track of one hole position is referred to as "trepanning processing". FIG. 8B illustrates a state after the trepanning processing at the first stage.

Note that in the trepanning processing at the first stage, a side of the resin layer 82 to the copper layer 81 is normally processed somewhat.

The laser deflection mechanism described above or a similar mechanical table drive mechanism operates for the copper layer 81 of each of the other hole positions to carry out the similar trepanning processing. After this is terminated, by mechanically varying an interval with a laser irradiation mechanism (not illustrated in the drawings) on which a substrate, the laser deflection mechanism, and the like are mounted to change a focal position, a diameter of laser beam is made larger. This causes energy density of the laser pulse to become lower.

The laser deflection mechanism described above or the table drive mechanism then operates to irradiate the laser pulse to the trepanning processed hole position once or multiple times as a second stage. Hereinafter, processing of irradiation to one hole position once or multiple times is referred to as "punching processing".

In this punching processing at the second stage, processing for the resin layer 82 is mainly carried out. FIG. 8C illustrates a state after the punching processing at the second stage.

Each of the blind holes 83 has a depth up to this side of the copper layer 84. The energy density of the laser pulse in the punching processing at the second stage is adjusted so as not to damage the copper layer 84 as much as possible. A driving operation of the laser deflection mechanism described above or the similar mechanical table drive mechanism is executed to carryout the similar punching processing for each of the other hole positions. The punching operation is then terminated.

In the conventional technology as described above, in the trepanning processing for the copper layer 81 at the first stage, the mechanical laser deflection mechanism irradiates the laser pulse to the multiple sites along the predetermined spiral track at the one hole position. Thus, it takes much time. In addition, in the processing for the resin layer 82 at the second stage, the punching processing is carried out at the same processing position as that at the first stage. Thus, the driving operation of the mechanical laser deflection mechanism or the table drive mechanism is required again. Therefore, there is a defect that a processing time thereof becomes longer.

Paragraphs 0037 to 0038 of International Publication NO. WO2016/185614 (hereinafter, referred to as "Patent Document 1") discloses a conventional technology as described above, wherein in a case where blind holes are made in a substrate in which a copper layer is provided on a substrate surface thereof and a resin layer is laminated beneath the copper layer, trepanning processing for the copper layer at a first stage and punching processing for the resin layer at a second stage are carried out.

Further, Paragraphs 0004 to 0005 of Japanese Patent Application Laid-Open Publication No. 2003-48088 (hereinafter, referred to as "Patent Document 2") discloses a technique wherein in a case where blind holes are made in a substrate in which a conductor layer is provided on a substrate surface thereof and an insulating layer is laminated beneath the conductor layer, only trepanning processing is carried out by using a mechanical laser deflection mechanism such as a galvano scanner.

In this technique of Patent Document 2, there is a defect that a processing time becomes longer because of the trepanning processing by the mechanical laser deflection operation. Moreover, Paragraph 0007 describes that irradiation energy is lowered in a case where the insulating layer is to be processed. However, Patent Document 2 does not disclose how to specifically lower the irradiation energy.

Further, Paragraphs 0044 to 0049 of Japanese Patent Application Laid-Open Publication No. 2003-136270 (hereinafter, referred to as "Patent Document 3") discloses a technique wherein as a system to carry out trepanning processing at a high speed, an acousto-optic device (hereinafter, abbreviated as "AOD") capable of a high-speed deflection operation is arranged at a former stage of a mechanical laser deflection mechanism such as a galvano scanner, and a deflection operation for the AOD is controlled to successively irradiate a laser pulse to multiple sites along a predetermined track.

With respect to this technology described in Patent Document 3, Patent Document 3 does not make reference to how energy for processing each layer is adjusted when a substrate including layers whose energy required for processing is different from each other is processed. Therefore, processing quality cannot be ensured under the circumstances.

SUMMARY OF THE INVENTION

It is thus an object of the present invention to facilitate controls when punching against multiple positions of a substrate including layers whose energy required for processing is different from each other is carried out by trepanning processing using laser, whereby a processing time thereof is shortened and processing quality thereof is ensured.

In order to solve the problems described above, a representative laser processing apparatus according to the present invention disclosed in the present application includes: a laser oscillator configured to oscillate a laser pulse; a first laser deflection unit configured to deflect the laser pulse emitted from the laser oscillator in a two-dimensional direction; a second laser deflection unit configured to deflect the laser pulse emitted from the first laser deflection unit in a two-dimensional direction on a same plane as that of the two-dimensional direction of the first laser deflection unit, an operation speed of the second laser deflection unit being slower than that of the first laser deflection unit; a laser oscillation control unit configured to control an operation of the laser oscillator; a first laser deflection control unit configured to control an operation of the first laser deflection unit; and a second laser deflection control unit configured to control an operation of the second laser deflection unit. In this case, the laser processing apparatus is configured to irradiate the laser pulse emitted from the second laser deflection unit onto a substrate to process a plurality of processing positions in the substrate. Further, the first laser deflection control unit controls the first laser deflection unit to successively irradiate the laser pulse to multiple sites along a predetermined track in each of the processing positions in turn, and controls the first laser deflection unit to change energy of the laser pulse emitted from the first laser deflection unit in a middle of repeating the irradiation on the predetermined track. Moreover, the processing is completed by successive irradiation to the multiple sites in each of the processing positions.

Further, a representative laser processing method disclosed in the present application includes: deflecting, by a first laser deflection unit, a laser pulse emitted from a laser oscillator in a two-dimensional direction; deflecting, by a second laser deflection unit, the laser pulse emitted from the first laser deflection unit in a two-dimensional direction on a same plane as that of the two-dimensional direction of the first laser deflection unit, an operation speed of the second laser deflection unit being slower than that of the first laser deflection unit; irradiating the laser pulse emitted from the second laser deflection unit onto a substrate to process a plurality of processing positions in the substrate; successively irradiating, by the first laser deflection unit, the laser pulse to multiple sites along a predetermined track in each of the processing positions in turn; changing energy of the laser pulse emitted from the first laser deflection unit in a middle of repeating the irradiation on the predetermined track; and completing the processing by successive irradiation to the multiple sites in each of the processing positions.

Note that representative features of the invention disclosed in the present application are as described above, but features that is not explained herein are applied to an embodiment described below, and are recited in the following claims.

According to the present invention, it is possible to facilitate controls when punching against multiple positions of a substrate including layers whose energy required for processing is different from each other is carried out by trepanning processing using laser, whereby it is possible to shorten a processing time thereof and to ensure processing quality thereof.

BRIEF DESCRIPTIONS OF THE DRAWINGS

FIG. 2 is a view for explaining roles of a galvano deflection unit and an AOD deflection unit in the laser processing apparatus illustrated in FIG. 1;

FIG. 3 is a view illustrating an example of RF signals in the laser processing apparatus illustrated in FIG. 1;

FIG. 4 is a view illustrating the content of a control table in the laser processing apparatus illustrated in FIG. 1;

FIG. 5 is a view illustrating the content of the control table in the laser processing apparatus illustrated in FIG. 1;

FIG. 6 is a timing chart for explaining processing progress by the laser processing apparatus according to one embodiment of the present invention;

FIG. 7 is a timing chart for explaining processing progress in a conventional laser processing method.

DESCRIPTIONS OF THE PREFERRED EMBODIMENTS

Hereinafter, an embodiment of the present invention will be described with reference to the drawings.

Figure 1:
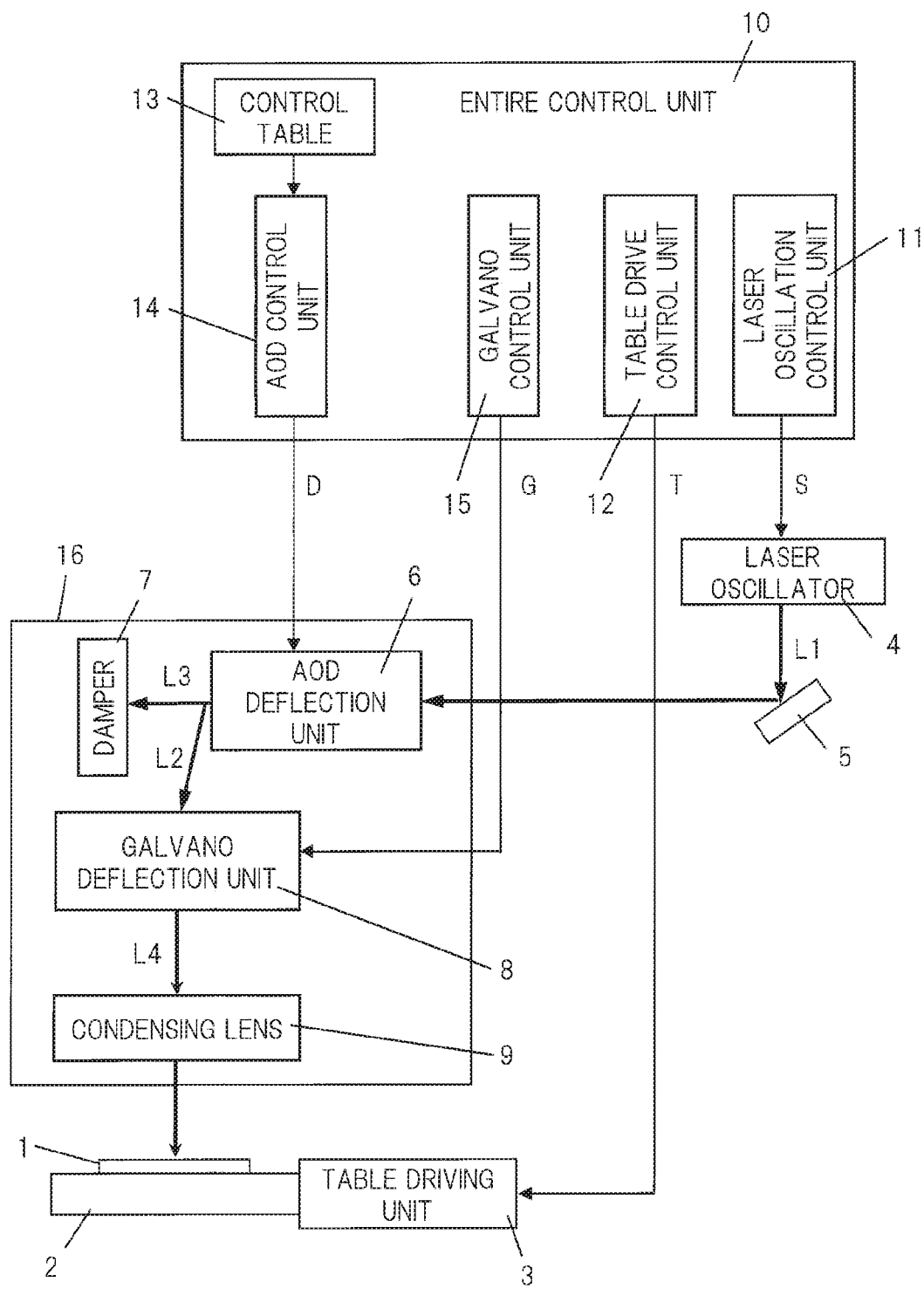
FIG. 1 is a block diagram of a laser processing apparatus according to one embodiment of the present invention.

FIG. 1 is a block diagram of a laser processing apparatus according to an embodiment of the present invention. Respective elements and connection lines are illustrated so long as it is considered that they are necessary for mainly explaining the present embodiment. However, it does not mean that all of the necessary elements and connection lines as the laser processing apparatus is illustrated.

Figure 8A:
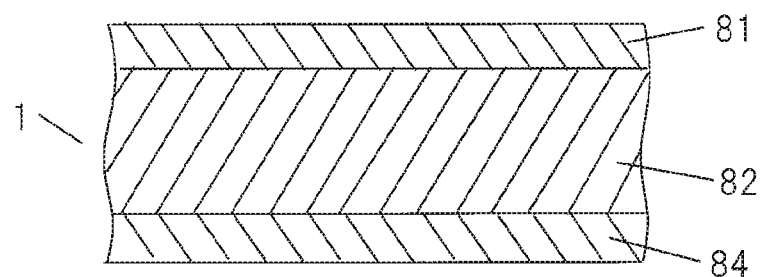
FIGS. 8A, 8B and 8C are sectional views of a substrate to be processed by the laser processing apparatus according to one embodiment of the present invention.
Figure 8B:
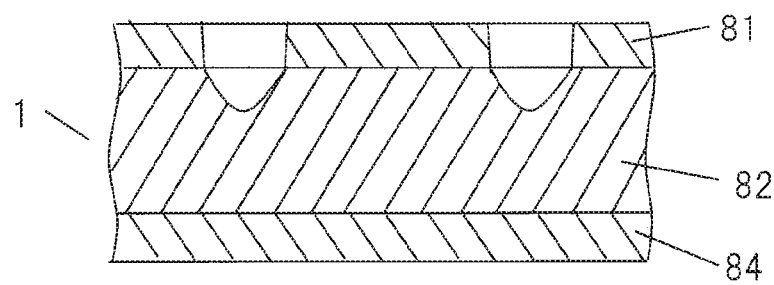
Figure 8C:
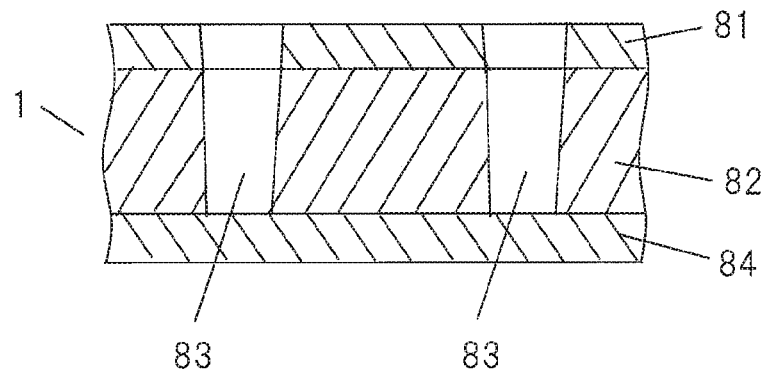

As illustrated in FIGS. 8A to 8C, in the laser processing apparatus that will be explained herein, blind holes 83 are made at multiple sites of a substrate 1 in which a copper layer 81 as a metal layer is provided on a surface thereof and a resin layer 82 is laminated immediately beneath the copper layer 81.

In FIG. 1, a reference numeral 2 indicates a table on which the substrate 1 to be processed is placed, and a reference numeral 3 indicates a table driving unit configured to drive the table 2. Specifically, the table driving unit is configured to move the table 2 in a two-dimensional direction in which two directions mutually make a right angle when viewed from the above of the substrate 1. A reference numeral 4 indicates a laser oscillator configured to oscillate a laser pulse L1 with a wavelength of a UV laser, a reference numeral 5 indicates a beam splitter configured to reflect the laser pulse L1 emitted from the laser oscillator 4, and a reference numeral 6 indicates an AOD deflection unit (that is, a first laser deflection unit) configured to deflect, by using an AOD, the laser pulse L1 reflected by the beam splitter 5 in a two-dimensional direction in which two directions mutually make a right angle when viewed from the above of the substrate 1.

A reference numeral 7 indicates a damper configured to absorb a laser pulse L3 that is not deflected in a processing direction by the AOD deflection unit 6 but penetrates through the AOD deflection unit 6. A reference numeral 8 indicates a galvano deflection unit (that is, a second laser deflection unit) configured to deflect, by using a galvano scanner, a laser pulse L2 deflected in the processing direction by the AOD deflection unit 6 in a two-dimensional direction in which two directions mutually make a right angle when viewed from the above of the substrate 1. A reference numeral 9 indicates a condensing lens configured to irradiate a laser pulse L4 from the galvano deflection unit 8 to a punching position of a printed substrate.

The deflection to the two-dimensional direction of each of the AOD deflection unit 6 and the galvano deflection unit 8 is carried out in the same plane of the substrate 1.

Note that in the present embodiment, although it is found by the following explanation, the two-dimensional direction of each of a table driving unit 3, the AOD deflection unit 6, and the galvano deflection unit 8 is set to become the same direction. Although it is not necessarily required for the present application, this is preferable for the control thereof.

In a case where deflection areas of the AOD deflection unit 6 and the galvano deflection unit 8 are compared with each other, the deflection area of the latter is overwhelmingly wider. In a case where operation speeds of the both are compared with each other, the operation speed of the former is overwhelmingly faster.

The laser optical system as described above is disclosed in Patent Document 3 mentioned above, for example.

A reference numeral 16 indicates a laser irradiating unit on which the AOD deflection unit 6, the damper 7, the galvano deflection unit 8, and the condensing lens 9 are implemented. By moving the table 2 in a right-left direction with respect to the paper of FIG. (hereinafter, referred to as an "X direction") and a vertical direction (hereinafter, referred to as a "Y direction"), relative displacement between the substrate 1 and the laser irradiating unit 16 is carried out. Further, by deflecting the laser pulse in each of the AOD deflection unit 6 and the galvano deflection unit 8 in the X direction and the Y direction, it is possible to irradiate the laser pulse onto a necessary punching position of the substrate 1.

Both systems including a system for movement (or deflection) in the X direction and a system for movement (or deflection) in the Y direction are provided for each of the table driving unit 3, the AOD deflection unit 6, and the galvano deflection unit 8.

A deflection area by the AOD deflection unit 6 and the galvano deflection unit 8 can be changed by moving the table 2.

Since the AOD deflection unit 6 is not required for mechanical motion, the operation speed thereof is fast, but the deflection area thereof is small. Therefore, the galvano deflection unit 8 is used for positioning the laser pulse to a specific coordinate of the substrate 1, while the AOD deflection unit 6 is used for positioning the laser pulse to a peripheral region in the X direction and the Y direction around the specific coordinate at a high speed.

FIG. 2 illustrates a relationship between the specific coordinate and the peripheral region. In FIG. 2, a reference numeral 20 indicates the specific coordinate, and a reference numeral 21 indicates the peripheral region around the specific coordinate 20.

In case of trepanning processing, the laser pulse is positioned to the specific coordinate 20 by the galvano deflection unit 8, and positioned in a peripheral region 21 including a trepanning processing area by the AOD deflection unit 6. Note that the positioning of the laser pulse to the specific coordinate 20 may be carried out not only by the galvano deflection unit 8, but also by cooperation of the AOD deflection unit 6 and the table driving unit 3.

Returning to FIG. 1, a reference numeral 10 indicates an entire control unit configured to control an operation of the whole apparatus. The entire control unit 10 is mainly configured by a processing apparatus based on program control, for example. Respective components and connection lines therein include logical ones. Further, a part of the respective components may be provided separately from the processing apparatus. Further, the entire control unit 10 may have control functions other than those described herein, and may be connected to blocks (not illustrated in the drawings).

A laser oscillation control unit 11, a table drive control unit 12, a control table 13, an AOD control unit (that is, a first laser deflection control unit) 14, and a galvano control unit (that is, a second laser deflection control unit) 15 are provided inside the entire control unit 10. The laser oscillation control unit 11 is configured to output a laser oscillation command signal S for commanding oscillation or attenuation of the laser pulse L1 by the laser oscillator 4. The table drive control unit 12 is configured to output a table driving signal T for controlling the table driving unit 3. The control table 13 is configured to register control information for controlling the AOD deflection unit 6. The AOD control unit 14 is configured to output an AOD driving signal D for controlling the AOD deflection unit 6 in accordance with the content of the control table 13. The galvano control unit 15 is configured to output a galvano control signal G for controlling the galvano deflection unit 8.

The AOD control unit 14 and the galvano control unit 15 respectively control two AOD deflection units 6 including an X system and a Y system, and two galvano deflection units 8 including an X system and a Y system. Although only one control table 13 is illustrated in FIG. 1, two control tables 13 including an X system and a Y system are provided.

The AOD driving signals D outputted from the AOD control unit 14 consist of RF signals. A deflection angle of the AOD deflection unit 6 is changed by frequency of this RF signal, and emission energy is changed by an amplitude level of this RF signal.

FIG. 3 illustrates an example of the AOD driving signals D. Here, frequencies of AOD driving signals Da, Db are respectively fa and fb, and amplitudes thereof are respectively Aa and Ab. The frequency fb is higher than the frequency fa, and the amplitude Ab is larger than the amplitude Aa.

When the AOD driving signal Db is applied thereto, the deflection angle and the emission energy of the AOD deflection unit 6 respectively become larger than those when the AOD driving signal Da is applied thereto.

Data for determining amplitude to be supplied at that time are registered in the control table 13 for each frequency of the
RF signals to be supplied to the AOD deflection unit 6.

On the basis of the present invention, data for determining two kinds of amplitudes are registered in the control table 13 for each frequency of the RF signals to be supplied to the AOD deflection unit 6.

Namely, as illustrated in FIG. 4, data for determining amplitudes C-Ax1, C-Ax2, C-Ax3, . . . when the copper layer 81 is processed and data for determining amplitudes P-Ax1, P-Ax2, P-Ax3, . . . when the resin layer 82 is processed are registered in a control table 13X for an X system for each frequency fx1, fx2, fx3, . . . of the RF signals to be supplied to the AOD deflection unit 6.

Further, as illustrated in FIG. 5, data for determining amplitudes C-Ay1, C-Ay2, C-Ay3, . . . when the copper layer 81 is processed and data for determining amplitudes P-Ay1, P-Ay2, P-Ay3, . . . when the resin layer 82 is processed are registered in a control table 13Y for a Y system for each frequency fy1, fy2, fy3, . . . of the RF signals to be supplied to the AOD deflection unit 6.

Note that the content of the control tables 13X and 13Y herein are those for explaining a logical relationship between the mutual data. For example, in case of the control table 13X, data indicating positions x1, x2, x3, . . . in the X direction are not necessarily registered for each frequency fy1, fy2, fy3, . . . of the RF signals.

The amplitude of each of the RF signals when the copper layer 81 is processed is set so that the emission energy from the AOD deflection unit 6 is adapted for the processing of the copper layer 81. The amplitude of each of the RF signals when the resin layer 82 is processed is set to be smaller than the amplitude of each of the RF signals when the copper layer 81 is processed so that the emission energy from the AOD deflection unit 6 is adapted for the processing of the resin layer 82.

Here, for example, as disclosed in Japanese Patent Application Laid-Open Publication No. 2008-36667, the emission energy from the AOD deflection unit 6 varies depending upon the frequency of the RF signal. Therefore, it is necessary to correct the amplitude of the RF signal in order to obtain predetermined emission energy regardless of high frequency or low frequency of the RF signal.

The amplitudes of the RF signals for respectively processing the copper layer 81 and the resin layer 82, which are registered in the control tables 13X and 13Y described above, are further adjusted on the basis of the amplitudes after correction, and are obtained from experiment data as they are or by incorporating a calculation formula to them.

In a case where blind holes are made at the multiple sites of the substrate 1 illustrated in FIG. 8, the laser processing apparatus described above completes processing at each processing position by only trepanning processing, and operates as follows. FIG. 6 is a timing chart for explaining processing progress thereof.

Under control of the entire control unit 10, the galvano deflection unit 8, cooperation of the galvano deflection unit 8 and the AOD deflection unit 6, or cooperation of the galvano deflection unit 8, the AOD deflection unit 6, and the table driving unit 3 positions a laser irradiation position at one specific coordinate 20 of the substrate 1 illustrated in FIG. 2, and the AOD deflection unit 6 is controlled as follows to successively irradiate the laser pulse to the multiple sites in the peripheral region 21 illustrated in FIG. 2 so as to draw a predetermined spiral track.

As a first step, the AOD control unit 14 first uses data for determining amplitude for a copper layer from the control table 13 to control the AOD deflection unit 6 to carry out successive irradiation along the predetermined spiral track once or multiple times. In this case, in a case where the irradiation on the same track is repeated multiple times, laser irradiation to the same position is periodically carried out multiple times.

The processing of the copper layer 81 is mainly carried out herein, and a state after this trepanning processing becomes that as illustrated in FIG. 8B.

Then, as a next step, the AOD control unit 14 uses data for determining amplitude for a resin layer from the control table 13 to switch into the control of the AOD deflection unit 6 to newly carry out successive irradiation along the predetermined spiral track once or multiple times in the similar manner to that described above. In this case, as well as the above step, in a case where the irradiation on the same track is repeated multiple times, laser irradiation to the same position is periodically carried out multiple times.

Therefore, the emission energy from the AOD deflection unit 6 herein is set to become lower than that during the processing of the copper layer 81, and the processing of the resin layer 82 is then carried out mainly. The substrate 1 thereafter becomes a state as illustrated in FIG. 8C, and the processing for the one punching position is completed.

Then, the galvano deflection unit 8, cooperation between the galvano deflection unit 8 and the AOD deflection unit 6, or cooperation among the galvano deflection unit 8, the AOD deflection unit 6, and the table driving unit 3 positions the laser irradiation position at another specific coordinate 20 provided at the other position than that of the above specific coordinate 20, and trepanning processing is carried out in the similar manner to the above.

According to the embodiment described above, in a case where punching is carried out against the multiple positions of the substrate 1 illustrated in FIG. 8 in which the copper layer 81 is provided on the substrate surface and the resin layer 82 is laminated immediately beneath the copper layer 81, it is possible to carry out the trepanning processing for the resin layer 82 after the trepanning processing for the copper layer 81. Therefore, a next and further driving operation by a mechanical laser deflection mechanism or a table drive mechanism for punching processing for the resin layer 82 after the trepanning processing for the copper layer 81, which has been carried out conventionally, is never required.

Moreover, the trepanning processing for the copper layer 81 and the resin layer 82 is carried out by using the AOD deflection unit 6 that does not include any mechanical operation and whose operation speed is fast. Therefore, it is possible to shorten the processing time significantly.

Further, in a case where the resin layer 82 is processed, processing energy (that is, the emission energy) is made smaller than that when the copper layer 81 is processed. This does not cause the copper layer 84 provided beneath the resin layer 82 to be damaged. Therefore, it is possible to ensure processing quality thereof.

Moreover, irradiation energy is lowered when the resin layer 82 is processed, but there is no need to change the emission energy from the laser oscillator 4. Namely, merely by adjusting information on amplitude of the RF signal, which is registered in the control tables 13X and 13Y for controlling the deflection operation for the AOD deflection unit 6, it is possible to change the irradiation energy.

It is thought that the emission energy from the laser oscillator 4 itself is controlled in order to change the irradiation energy. However, such a method requires controls of both the laser oscillator 4 and the AOD deflection unit 6. According to the embodiment described above, only the AOD deflection unit 6 may be controlled. Therefore, the number of adjustment targets and the number of control targets becomes smaller, and this makes it possible to facilitate controls thereof, whereby it is possible to simplify an apparatus design of the laser processing apparatus.

Further, it is possible to keep an oscillation state of the laser oscillator 4 constant. Therefore, it is possible to heighten stability of the laser, and this makes it possible to improve the processing quality thereof.

As described above, the present invention has been described specifically on the basis of the embodiment. However, the present invention is not limited to this embodiment. It goes without saying that the present invention can be changed variously without departing from the substance thereof, and may include various modification examples.

For example, in the embodiment described above, the case where the trepanning processing is carried out along the predetermined spiral track has been described. However, a shape of the predetermined track is not necessarily the spiral shape, and there is a method of forming the predetermined track in a concentric circular shape or a rectangular shape.

Further, in a case where the trepanning processing is repeatedly carried out along the predetermined track multiple times, a track this time is not necessarily the same as the previous track. Further, the track when the resin layer 82 is processed may be changed from the track when the copper layer 81 is processed. In short, a route of the track may be determined in advance.

Further, in a case where the trepanning processing is repeatedly carried out along the predetermined track multiple times in accordance with constituent material of the substrate 1, the number of repeated times of the trepanning processing along the predetermined track is not necessarily an integer depending upon a kind of constituent material, the magnitude of energy of the laser pulse, or a size of a beam spot diameter. For example, the final trepanning processing may be terminated in the middle of the track.

Moreover, the case where the blind holes 83 are made in the substrate 1 with three layers in which the copper layer 84 is laminated beneath the resin layer 82 as illustrated in FIG. 8 has been described. However, the present invention may be applied to a case where through holes are made in a substrate with two layers in which the copper layer 84 is not provided. Further, the case where the copper layer as a layer whose energy required for processing is higher and the resin layer as a layer whose energy required for processing is lower are used has been described. However, each of the copper layer and the resin layer may be made of the other material. Moreover, a substrate in which three or more layers are laminated may be used.

What is claimed is:

1. A laser processing apparatus, comprising:
   a laser oscillator configured to oscillate a laser pulse;
   a first laser deflection unit configured to deflect the laser pulse emitted from the laser oscillator in a two-dimensional direction in accordance with frequency of a driving signal to be supplied, and to change energy of the laser pulse emitted from the laser oscillator in accordance with amplitude of the driving signal to be supplied;
   a second laser deflection unit configured to deflect the laser pulse emitted from the first laser deflection unit in a two-dimensional direction on a same plane as that of the two-dimensional direction of the first laser deflection unit, an operational speed of the second laser deflection unit being slower than that of the first laser deflection unit;
   a movable table, the movable table configured to support at least one substrate to be processed, wherein the at least one substrate to be processed comprises a laminate;
   at least one control unit configured to control an operation of at least one selected from the group consisting of the laser oscillator, the first laser deflection unit, the second laser deflection unit, and the moveable table;
   the three-layer laminate comprises a third layer, a second layer laminated onto the third layer, and a first layer, made up of a material different from that of the second layer, laminated onto the second layer, and
   the laser processing apparatus is configured to use the laser pulse emitted from the first laser deflection unit to initiate, and repeat, a trepanning processing for irradiating the laser pulse emitted from the first laser deflection unit along a predetermined track at multiple punching positions on the first layer of the laminate, thereby creating at least a hole in the first layer of the laminate, and thereafter adjusting the laser pulse emitted from the first laser deflection unit to cause forming of a blind hole in the second layer of the laminate,
   the control unit stores, in a memory, a control table determining a first amplitude of the driving signal corresponding to the first energy and a second amplitude of the driving signal corresponding to the second energy for a same frequency,
   the control unit sets a first energy of the laser pulse emitted from the first laser deflection unit, at a time of application of the laser pulse to the first layer of the laminate to be punched when the trepanning processing is initiated and repeated multiple times; and the control unit thereafter sets a second energy of the laser pulse applied to the second layer of the laminate, in accordance with the control table;
   wherein the second laser deflection control unit is used to position the laser pulse at a specific coordinate on the substrate, and
   the first laser deflection control unit is used to position the laser pulse at a high speed in a peripheral region around the specific coordinate in the two-dimensional direction.

2. The laser processing apparatus according to claim 1, wherein the first laser deflection unit is configured as an acousto-optic device.

3. The laser processing apparatus according to claim 1, wherein the first layer of the laminate is a metal layer, and the second layer is a resin layer, and the second energy is smaller than the first energy.

4. The laser processing apparatus according to claim 1, wherein a value of the first amplitude in the control table is such a corrected value as to become the first energy each time the frequency is different, and
a value of the second amplitude in the control table is such a corrected value as to become the second energy each time the frequency is different.

* * * * *